M. S. FARMER.
FLEXIBLE DISK HARROW.
APPLICATION FILED SEPT. 16, 1911.
1,136,908.
Patented Apr. 20, 1915.
2 SHEETS—SHEET 1.
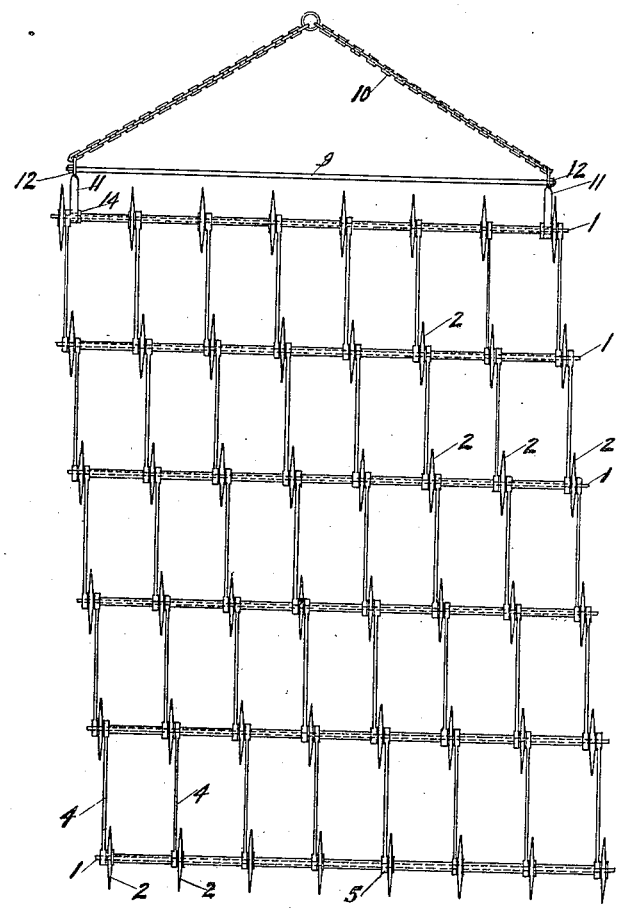
Fig. 1.
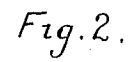
Fig. 2.
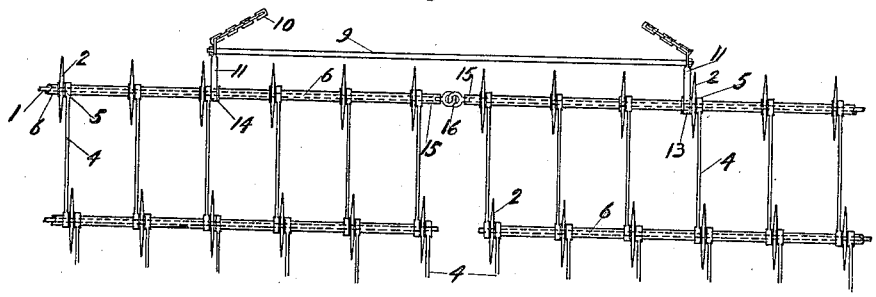
WITNESSES:
INVENTOR.
M. S. FARMER
BY
ATTORNEY.

M. S. FARMER.
FLEXIBLE DISK HARROW.
APPLICATION FILED SEPT. 16, 1911.
1,136,908.
Patented Apr. 20, 1915.
2 SHEETS—SHEET 2.
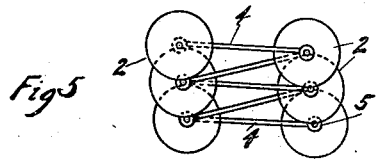
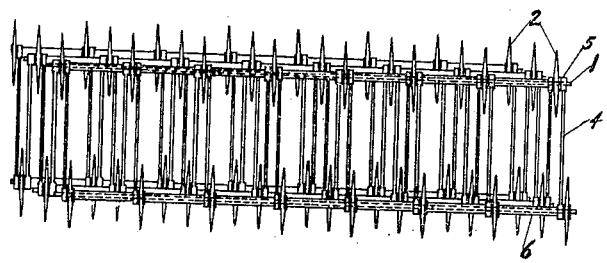
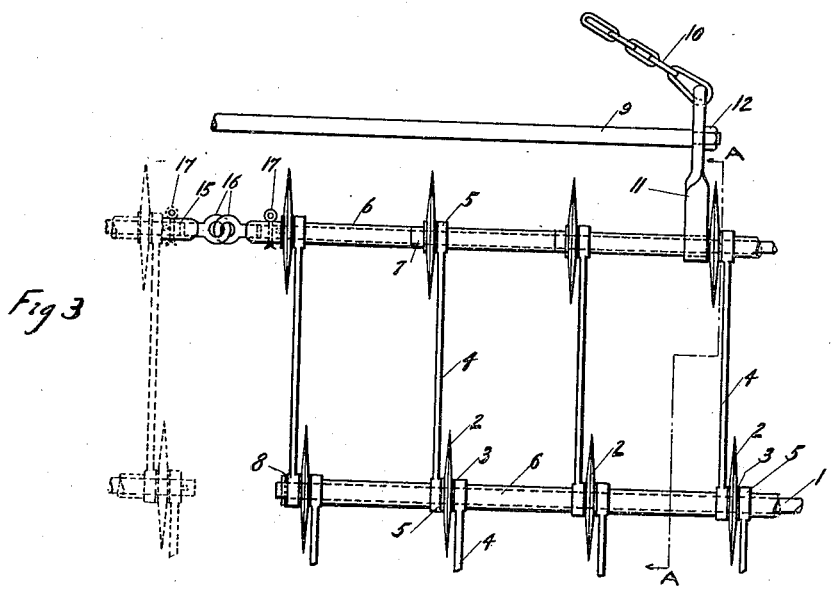
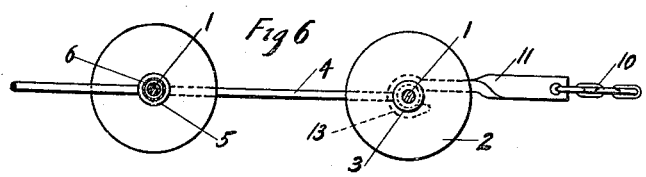
WITNESSES:
INVENTOR.
M. S. FARMER
BY
ATTORNEY.

UNITED STATES PATENT OFFICE.

MATTHEW S. FARMER, OF WASHINGTON, DISTRICT OF COLUMBIA, ASSIGNOR TO INTERNATIONAL HARROW CULTIVATOR COMPANY, OF BIRMINGHAM, ALABAMA, A CORPORATION OF NEVADA.

FLEXIBLE DISK HARROW.

1,136,908. Specification of Letters Patent. Patented Apr. 20, 1915.

Continuation of application Serial No. 578,494, filed August 23, 1910. This application filed September 16, 1911. Serial No. 649,727.

*To all whom it may concern:*

Be it known that I, MATTHEW S. FARMER, a citizen of the United States of America, residing at Washington, in the District of Columbia, have invented certain new and useful Improvements in Flexible Disk Harrows, of which the following is a specification.

My invention relates to a novel farming implement adapted for use as a harrow and cultivator and consists essentially in the provision of a flexible frame extended in length so as to comprise a series of loosely coupled transverse shafts upon each of which is mounted a series of spaced freely rotatable disks. In my preferred arrangement the disks are arranged in diagonal rows from front to rear and in order to standardize the parts of the apparatus I prefer that the several cross shafts should be substantially equal in length and arranged in echelon.

It is a further idea of mine that the diagonal rows of disks extending from front to rear should not overlap in their work, each disk having a line of travel which is spaced from and non-alining with the lines of travel of the other disks. In extending the flexible frame and spacing the disks on each cross shaft widely apart, I produce an essentially novel form of implement, as each succeeding shaft carrying its widely spaced disks will cut the ground at points widely spaced and yet which are close to the cuts made by the disks on the preceding or succeeding shaft. This construction, while working the ground as closely as may be desired, provides for lifting the least number of disks out of working relationship from the ground when a disk thereon strikes an obstruction.

A further advantage of my invention lies in the manner of loosely coupling the transverse shafts by links which lie in the plane of the shafts and are so arranged as not to interfere with the folding of the harrow from front to rear to make it compact for shipment.

A further novel feature of my invention lies in the arrangement of the disks on the intermediate shafts so that they are disposed between the adjacent ends of links, one of which extends forward and the other to the rear. These links may be used to serve the purpose of cleaning the disks.

A further important feature of my invention is the mounting of the several disks on the shaft for free rotation thereon, as it is important that each disk should revolve entirely independently of the other disks and to this end the disks are given widened bearing surfaces so that they run true on the shaft and yet may be readily slipped on and off.

A further advantage of my invention lies in the convenience and facility with which any one of the sections of the harrow may be taken apart or assembled, as by removing a pin at one end of the shaft it may be readily slipped out of the sleeves, links and disks thereon and any new part readily inserted.

These several features contribute more or less to the production of a distinctly novel form of farming implement, which will give new results not heretofore obtained by any similar type of implement and I therefore consider that having produced a new form of implement I am entitled to such modifications or unimportant changes as may be made therein without departing from the principles of construction and operation defined in this specification.

I have illustrated one embodiment of my invention in the accompanying drawings, in which:—

Figure 1 is a plan view of my improved harrow. Fig. 2 is a similar view showing two of the harrows and the manner of connecting same together and the draft devices. Fig. 3 is an enlarged plan view of a portion of Fig. 2. Fig. 4 is a plan view of the harrow when folded into compact form for shipment. Fig. 5 is an end view of Fig. 4. Fig. 6 is an enlarged side elevation of a part of the harrow.

Similar reference numerals refer to similar parts throughout the drawings.

The preferred embodiment of my invention comprises a series of shafts 1, on each of which is mounted, for free and independent rotation thereon, a series of spaced disks 2 which taper from a thickened hub portion 3 to a sharp peripheral cutting edge. This widened bearing surface 3 is provided to cause the disks to run on the shafts without being too closely engaged on each side by the spacing and connecting devices.

The several shafts are connected by links 4 having eyes 5 at each end through which the shafts 1 pass free to turn therein. These links are all of the same size and preferably lie in the plane of the shafts 1 which are thus flexibly connected, there being sufficient lost-motion to permit considerable flexing play for a shaft angularly in a vertical plane relatively to the adjacent shafts to which it is coupled. The several links are made longer than the diameter of the disks 2 to space the transverse rows of disks well apart and avoid any possibility of the several disks interfering with each other in their operation, as would be the case were the disks on one shaft to overlap the adjacent disks on adjoining shafts. The several disks on a shaft are spaced by cylindrical sleeves 6 which are freely rotatable on the shaft. Preferably, the disks on all intermediate shafts are arranged each between the eyes 5 of a pair of links 4, one extending toward the front and the other to the rear. The sleeves 6 for the front and rear shafts may be made slightly longer to take up the width of an eye 5, or I may use sleeves of standard length together with short sleeve sections 7, as seen in Fig. 3.

The outer ends of the shafts are provided with holes to receive cotter pins 8 which lock the several parts in assembled position on each shaft without, however, wedging them together in such manner as to interfere with the free and independent rotation of the disks and sleeve about the shaft or of the shaft with reference to the disks, sleeves and links, which is of material importance in preventing the disks ever becoming locked against rotation under operating conditions.

The disks are arranged in echelon or stepped relation in diagonal rows extending from front to rear of the harrow, each succeeding disk in a diagonal row, by virtue of this arrangement, having a line of travel parallel with and close to the line of travel of the preceding and succeeding disk in its respective diagonal row. This arrangement is secured in a simple and effective way by having each link 4 arranged on opposite sides of the adjacent disks on the shafts which it connects. This arrangement spaces each disk to the right of the preceding disk a distance corresponding to the width of the link or its eye 5. My preferred arrangement is that the rear disk of a given diagonal row will have its line of travel spaced equi-distantly from the next preceding disk in its own row and the front disk in the row next on the right. This causes a uniform cutting of the earth by disks which are well spaced in all directions on a flexible frame. The equi-distant spacing of the several disks throughout the harrow as they would appear in front elevation, is perhaps best illustrated in Fig. 4 where the harrow is collapsed and it is made clear that no disks work in alinement.

The preferred manner of connecting the several shafts in echelon has the advantage of permitting all the shafts to be of a standard length, thereby increasing the cheapness and facilitating the repair of the harrow.

A suitable draft means for the harrow comprises a transverse rod 9 connected at each end to a chain 10 and which is fastened to the clips 11 by nuts 12. The clips have their inner ends bent over to form hooks 13 which are sprung into engagement with sleeves 6 on the front shaft 1. If desired, a nut or washer 14 may be mounted on the sleeves engaged by the clips to hold the clips from lateral movement thereon.

When it is desired to couple up several harrows so as to cover a greater amount of ground, I provide two socket pieces 15 having interlocking eyes 16 which act like a universal joint. The ends of these socket pieces are slipped over the adjacent ends of the front (or the front and rear) shafts 1 of the harrows and connected thereto by cotter pins 17 which are passed through suitable holes in the sockets and shafts. When two harrows are connected up in this manner, the clips 11 are unhooked from the two harrows and one is attached as shown in Fig. 2, to an intermediate sleeve 6 of each harrow. The clips 11 are formed of twisted metal plates as seen in Fig. 3, and the rod 9 has each end reduced and threaded so that it can be passed through a suitable opening in the clip 11 and the latter secured thereon by the nut 12.

In operation, the harrow is drawn over the ground preferably transversely of the rows, and it will be seen that it is extended from front to rear to cover a considerable territory, having its disks in such spaced relationship that each disk does its work with but little interference with the others and with great advantage over arranging the disks close together on shafts that are closely associated. The extension of the flexible frame from front to rear is necessary to provide for a close working of the surface of the ground with widely spaced disks on each shaft, and such extension must be increased proportionately to the spacing of the disks on each shaft for the same working of the ground. When a disk or spacer sleeve on a shaft strikes an obstruction, being freely rotatable, it will ride over it and, due to the connections, will only lift a part of the disks on its shaft out of the earth, and since the shaft will have angular play in a vertical plane relatively to adjacent shafts it will not lift the disks on those shafts out of the earth.

My arrangement of flexible frame with the disks arranged to cut the earth with sharpened peripheral edges in closely associated lines of travel, provides a novel form of harrow as well as a cultivator for young grain crops or any crops where it is desired to break and open up the earth without injuring the plants.

This application forms a continuation of an earlier application Serial No. 578,494, filed by me on the 23rd day of August, 1910.

Having thus described my invention, what I claim as new and desire to secure by Letters Patent, is:—

1. In a harrow, the combination of a plurality of spaced parallel rods, links arranged in echelon and connecting said rods, rotatable disks mounted on said rods, one face of each disk engaging one terminal of one of said links, and spacing sleeves on said rods interposed between said disks, substantially as described.

2. A flexible disk harrow comprising a series of transverse parallel bars equal in length and arranged in echelon, disks mounted in spaced relationship on each bar and the disks on the several bars being relatively arranged in echelon from front to rear to move in different paths of travel, rows of links which are arranged in echelon and loosely couple each bar to the succeeding bar, and draft appliances, said several bars and links being free of rigid connection to each other or to said draft appliances, substantially as described.

3. In a harrow, the combination of spaced parallel rods, links arranged in parallelism with each other and hinged to the rods to lie substantially in the same horizontal plane with the latter which are each free to rise and fall independently of the other, and rotatable disks mounted on said rods and arranged in diagonal rows and extending from front to rear of the harrow, the lines of travel of the disks in one row being spaced from each other and from the lines of travel of the disks in adjacent rows, substantially as described.

4. In a harrow, the combination of a plurality of spaced parallel rods, links arranged in echelon and connecting said rods, rotatable disks mounted on said rods, and spacer means on the rods to space the disks and links thereon.

5. A flexible disk harrow comprising a series of parallel transverse shafts, series of links connecting said shafts and arranged in echelon, disks mounted for free rotation on said shafts and arranged in echelon, the disks and links being distributed in diagonal rows across the harrow, as and for the purposes described.

6. A flexible disk harrow comprising an extended series of parallel transverse shafts, disks mounted for free rotation on each shaft, and means to flexibly couple the shafts for free and independent vertical motion, the disks throughout the harrow being arranged in parallel diagonal rows extending from front to rear of the harrow and so spaced that the lines of travel of the disks in each row are spaced from each other and from the lines of travel of the disks in adjacent rows.

7. A flexible disk harrow comprising a series of transverse disk shafts of equal length which are arranged in echelon, disks freely rotatable on each shaft, links which loosely couple the shafts, a link being connected to a shaft between each pair of disks thereon, and means to space the disks to arrange them also in echelon, said shafts being connected only by said links which permit free relative vertical adjustment of the shafts, substantially as described.

8. A flexible disk harrow comprising parallel transverse shafts, links arranged in echelon which flexibly connect said shafts, and disks mounted for free rotation on said shafts, the links being greater in length than the diameters of the disks to space the transverse rows of disks, substantially as described.

9. A flexible disk harrow comprising a series of parallel transverse shafts, disks mounted on each shaft and being widely spaced apart thereon, links which loosely couple each adjacent pair of shafts that are otherwise free of rigid connections and space the adjacent transverse rows of disks well apart, the links that connect to each adjacent pair of shafts being disposed out of alinement, the disks being arranged in diagonal rows from front to rear, and the whole forming a loosely jointed flexible and foldable frame-work elongated from front to rear, the disks being so spaced throughout that all successive rows of disks cut the ground in different, closely associated parallel lines as the harrow is dragged along, substantially as described.

10. A harrow having an elongated framework from front to rear composed of parallel transverse shafts, link bars through the ends of which the shafts pass loosely and which bars are free of any other connections, sharp cutting disks having center hub bearings which are mounted for free rotation on each shaft and widely spaced apart thereon, the links being longer than the diameter of the disks to space the peripheries of adjacent transverse rows of disks apart, the disks being arranged in parallel diagonal rows and adapted to move in closely associated and substantially equi-distantly spaced parallel lines of travel throughout the harrow, substantially as described.

11. A harrow comprising a series of parallel disk shafts and link bars which loosely connect the shafts to form a flexible frame-work in which the several shafts are free to independently rise and fall, and a plurality of cutting disks distributed over said frame-work to have closely associated different parallel lines of travel that are substantially equi-distantly spaced, said disks having continuous sharpened cutting peripheries and being widely spaced apart on each shaft relatively to the space between the adjacent cutting lines of the several disks, the frame-work being extended in length from front to rear to increase the number of transverse rows of disks and increase the number of lines of travel of disks on other shafts that are interposed between the lines of travel of adjacent disks of the same shaft, substantially as described.

12. A harrow comprising a series of parallel disk shafts and link bars which loosely connect each adjacent pair of shafts to form a flexible frame-work, the several shafts in which are free to rise and fall independently, said links being so disposed as to permit the shafts to be folded over or under other shafts to collapse the frame-work, and a plurality of cutting disks distributed over said frame-work to have closely associated parallel lines of travel that are substantially equi-distantly spaced, said disks having continuous sharpened cutting disk peripheries and their arrangement being characterized by the fact that they are widely spaced on a given shaft relatively to the spacing of said lines of travel, the frame-work being extended in length to space the transverse rows of disks and to reduce the spacing between lines of travel, by increasing the number of lines of travel of disks on other shafts of the harrow which cut the ground in lines interposed between the cutting lines of adjacent disks on a given shaft, substantially as described.

In testimony whereof I affix my signature in presence of two witnesses:

MATTHEW S. FARMER.

Witnesses:
Wm. G. Clary,
Frank O. Parker.

Copies of this patent may be obtained for five cents each, by addressing the "Commissioner of Patents, Washington, D. C."